United States Patent [19]

Ungar et al.

[11] Patent Number: 4,784,908
[45] Date of Patent: Nov. 15, 1988

[54] STATIC DISSIPATIVE LAMINATE FOR WORK SURFACES

[75] Inventors: Israel S. Ungar, Randallstown; Robin D. O'Dell, Pasadena; Alice Simon, Glen Burnie; Joseph A. Lex, Pasadena, all of Md.

[73] Assignee: Nevamar Corporation, Odenton, Md.

[21] Appl. No.: 84,803

[22] Filed: Aug. 13, 1987

Related U.S. Application Data

[63] Continuation-in-part of Ser. No. 843,649, Mar. 25, 1986, abandoned.

[51] Int. Cl.$^4$ .......................... B32B 9/00; B32B 9/06; B32B 27/10
[52] U.S. Cl. ..................................... 428/332; 428/408; 428/499; 428/511; 428/525; 428/530; 428/696; 428/922
[58] Field of Search ............... 428/511, 530, 525, 696, 428/408, 422, 499, 332

[56] References Cited

U.S. PATENT DOCUMENTS

| | | | |
|---|---|---|---|
| 4,379,194 | 4/1983 | Clarke et al. | 428/530 |
| 4,395,452 | 7/1983 | Scher et al. | 428/331 |
| 4,480,001 | 10/1984 | Cannady, Jr. | 428/511 X |

*Primary Examiner*—P. C. Ives
*Attorney, Agent, or Firm*—Browdy and Neimark

[57] ABSTRACT

A static dissipative laminate having a resistivity on the order of $10^6$ to $10^9$ ohms/square and a surface resistance in the static dissipative range even at very low humidities is produced by adding to the melamine resin for the decor sheet a small amount of ionic salt and a small amount of an aliphatic tertiary amine or glycerin which is believed to function as a humectant. The core sheets are formed of carbon filled paper impregnated with a phenolic resin containing a small amount of ionic salt.

20 Claims, 1 Drawing Sheet

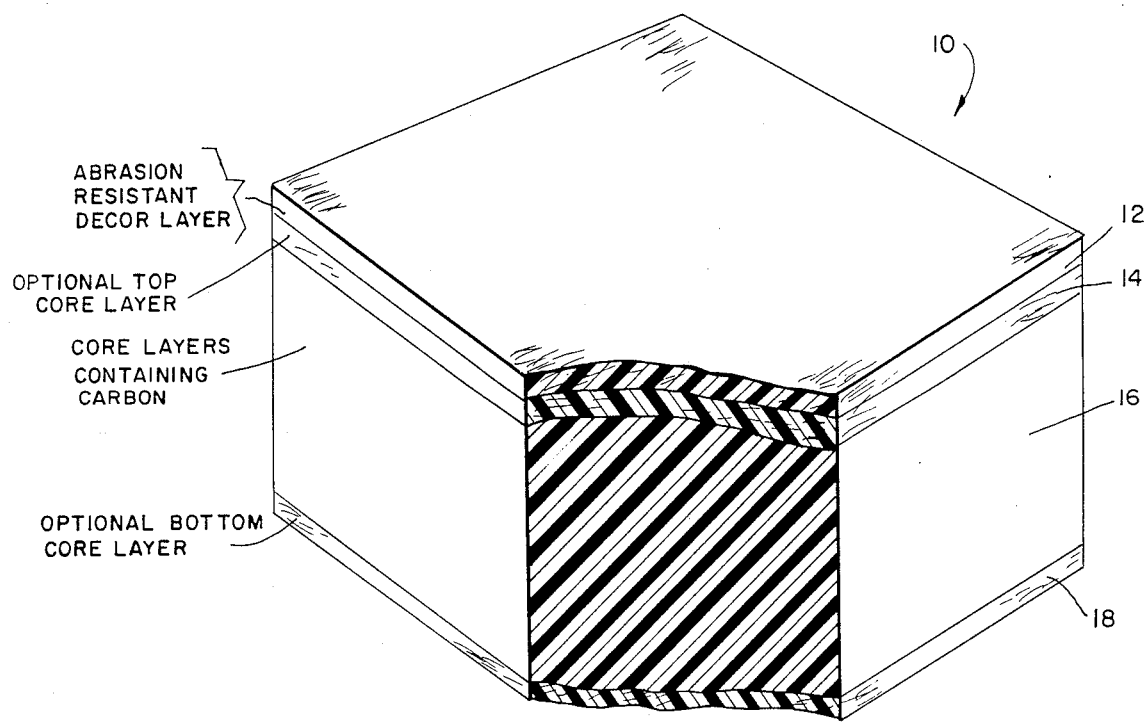

STATIC DISSIPATIVE LAMINATE FOR WORK SURFACES

This is a continuation-in-part of parent co-pending application Ser. No. 843,649, filed Mar. 25, 1986, now forfeited without prejudice in favor of the present application.

FIELD OF INVENTION

The present invention relates to static dissipative laminates and, more particularly, to static dissipative laminates particularly suitable as work tops for assembly of electronic components.

BACKGROUND OF THE INVENTION

Considerable interest has been shown in recent years for static dissipative and electrically conductive laminates for use in various environments, including static dissipative work surfaces and conductive flooring materials. Among the recent patents there may be mentioned the U.S. patents to Wilks et al U.S. Pat. No. 3,922,383; Grosheim et al U.S. Pat. No. 4,472,474; Cannady et al U.S. Pat. No. 4,480,001; Cannady U.S. Pat. No. 4,540,624; Berbeco U.S. Pat. No. 4,454,199 and Berbeco U.S. Pat. No. 4,455,350. The use of carbon filled paper is known, as is the use of salts, the latter having been previously known, noting patents such as Meiser U.S. Pat. No. 3,650,821 and Economy et al U.S. Pat. No. 3,567,689. However, no one product is suitable for all static dissipative and conductive environments, because different usages, i.e. environments, require different properties.

The Department of Defense defines the following relationship between static electrical properties and surface resistivity (in ohms/square):

anti-static: greater than $10^9$
static dissipative: between $10^6$ and $10^9$
conductive: less than $10^6$.

Surface resistivity of standard high pressure decorative laminate is about $10^{11}$ to $10^{13}$ ohms/square.

A static dissipative laminate having a resistivity on the order of about $10^6$ to $10^9$ ohms/square is needed for a work surface for the assembly of electronic components. Losses of electronic components attributable to electrostatic discharge amounts to tens of millions of dollars each year. Typically a tray or tote bin of electronic components such as integrated circuit chips, in being moved around, picks up a charge of thousands of volts which can reach 30,000 volts when the air is dry. When a so charged component is touched or put down, the charge is suddenly discharged, destroying or damaging the component. For this reason, electronic components are packaged in conductive containers. Workers wear special conductive clothing and shoes. Employees are grounded via wrist bands and floor mats. Air is conditioned and ionized. An assembler, who's hand is kept at zero potential by a grounded wrist strap, can "zap" a chip when he picks it up. If the table top, however, upon which the tote bin is placed is static dissipative and connected to a ground, then the 30,000 volts of charge will leak off the components before the operator touches them.

Thus, an important link in the chain of protection for the components against electrostatic discharge during assembly, repair and use is the work surface on which assembly takes place, i.e. the work top. It is important that this work top not be conductive. As noted above, its resistance should be about $10^6$ to $10^9$ ohms, and all work tops of less than $10^6$ ohms resistance are grounded through a $10^6$ ohm resistor. If the work top has a resistance of less than $10^6$ ohms, it becomes a safety hazard for electrical shock, a path for current between components, and it discharges too rapidly which may result in damage to components.

Present static dissipative laminates may suffer from other disadvantages in addition to being either too conductive or not conductive enough. Thus, some presently available static dissipative laminates have an upper surface containing carbon particles for providing a conductive path from the upper surface of the laminate to the interior. This can result in dusting of conductive material from the surface of the laminate as it wears, which conductive material by itself will result in damage due to electrical short circuits. In addition, the color of these laminates is limited to black, which can provide human engineering problems.

Another problem which occurs with conventional static dissipative laminates is that the surface of the laminate tends to lose its electrical conductivity when the relative humidity drops in winter time. Measured resistivity of conventional static dissipative and conductive laminates is strongly dependent on relative humidity, and can change several orders of magnitude between 50% relative humidity and 15% relative humidity. Prior art static dissipative and conductive laminates do not perform well at relative humidities below 25–30%. For this reason, work areas may have to be humidified, which is not always desirable due to the possibility of inducing corrosion in certain products and in certain equipment as well. In addition, the necessity for precise humidification increases the cost of handling the electronic components.

A number of high pressure decorative laminates having static dissipating or conducting properties are already on the market. Two of these use a highly conductive carbon impregnated layer below the decor sheet. Of these, one has an excessive surface resistivity and it appears that the upper layer is not sufficiently conductive. The other uses quaternary ammonium compounds in the upper layer, along with the conductive carbon containing paper therebelow, and while this laminate is adequate at normal relative humidity (about 50%), it is inadequate at low relative humidities. A third product of yet another manufacturer, although somewhat better, is still inadequate at low relative humidities.

Conventional static dissipative laminate has also introduced the problem of field suppression. This occurs when the laminate is constructed of a highly conductive layer buried under a relatively non-conducting surface. When a charged object is placed on the laminate surface, a field is induced in the buried conductive layer forming what is, in effect, a leaky capacitor. The overall result is that to an outside observer, e.g. a static electricity sensing meter such as an electrometer, a zero electrical potential exists when, in reality, the field is hidden within the laminate. When an object such as an electronic component is lifted from the laminate surface, the charge reappears thereby creating the static electricity hazard sought to be avoided.

SUMMARY OF THE INVENTION

It is, accordingly, an object of the invention to overcome deficiencies in the prior art, such as indicated above.

It is another object to provide for the safe and effective dissipation of static electricity from work tables, especially work tables for the assembly of electronic components.

Still another object is to provide an improved static dissipative laminate—not a conductive laminate—having a controlled resistance over a relatively narrow range of about $10^6$–$10^9$ ohms.

It is still another object of the present invention to provide an improved static dissipative laminate having a reduced disparity between surface resistivity and lower layer resistivity, and therefore a static dissipative laminate in which there is no field suppression problem.

It is a further object of the invention to provide an improved static dissipative laminate which has more consistent static dissipative properties regardless of the relative humidity of the surrounding air.

It is yet a further object of the present invention to provide an attractive static dissipative laminate which looks like normal decorative high pressure laminate and has good heat resistance, water resistance and stain resistance, as well as excellent abrasion resistance.

Another objective is to provide a high pressure decorative laminate meeting NEMA standards, which is post formable, and which has a zero volt charge after two seconds at 17% or lower relative humidity.

These and other objects and advantages of the instant invention will be more apparent from the following detailed description of certain exemplified embodiments, taken in conjunction with the accompanying drawing wherein:

BRIEF DESCRIPTION OF DRAWING

The sole FIGURE is a schematic perspective view, partly in section, of a laminate in accordance with the present invention.

DETAILED DESCRIPTION OF EMBODIMENTS

The FIGURE shows a static dissipative laminate 10 having an abrasion resistant decor sheet 12 as its upper layer, an optional standard core sheet layer 14 thereberneath, a plurality of carbon containing core layers 16 beneath the decor layer 12 and optional core layer 14, and an optional bottom core layer 18 of the same construction as core layer 14.

The decor sheet 12 may be solid colored or may have a design printed on its upper surface in accordance with conventional practice, and is preferably formed of alpha-cellulose paper impregnated with an aqueous solution of melamine-formaldehyde resin in the usual way. To give this layer after formation of the laminate the desired abrasion resistance, an ultra-thin abrasion resistant layer may be provided consistent with the Scher et al U.S. Pat. No. 4,255,480 and its progeny, or the copending application of Ungar et al Ser. No. 686,350, now U.S. Pat. No. 4,713,138. To make the laminate scuff resistant, the ultra-thin coating may be further modified to contain solid lubricant in accordance with O'Dell et al U.S. Pat. No. 4,567,087.

In order to give the laminate of the instant invention the desired surface resistance which is no higher than $10^9$ even at relative humidities as low as 17–25%, the melamine laminating resin is modified by the addition of a small amount of an ionic salt, i.e. no more than 7% by weight based on the resin solids, preferably 1–4%, and a similar quantity of a water miscible or soluble aliphatic tertiary amine, or the like, e.g. glycerin, preferably in an amount of 1–5% by weight based on the resin solids. The mechanism of the aliphatic tertiary amine or glycerin is not fully understood, although it may act as an humectant which increases moisture content and increases ionization of the salt at low relative humidities. In any event, the presence of the aliphatic tertiary amine or glycerin or its equivalent is essential.

The laminate core 16 comprises a plurality of paper sheets impregnated with an aqueous solution of melamine-formaldehyde resin or, preferably, phenol-formaldehyde resin in the usual way. Rather than using kraft paper as the paper for the core layers as is the practice in making conventional high pressure decorative laminate, instead the core sheets are formed of paper filled with carbon particles. This provides a short circuit path to rapidly dissipate local charges. However, it has been found that the core should not be highly conductive, i.e. its resistance should be controlled so as to lie within the static dissipative range or the slightly conductive range so that the aforementioned problem of field suppression can be avoided. Thus, in accordance with the present invention the resistance of the core 16 is controlled to lie within the range of $5 \times 10^4$ ohms to $5 \times 10^6$ ohms.

The conductivity (or, conversely, the resistivity) is controlled to give the aforementioned resistance values by the selective use of additives in the core layers. For this purpose, the impregnating resin for the core paper, preferably phenolic resin, is provided with up to 7% by weight based on the resin solids, preferably 1–4%, of an ionic salt, preferably lithium chloride.

Core layers 14 and 18, in which the paper is conventional kraft paper, may be located immediately above and below the core 16 formed of carbon filled paper. The use of the optional carbon-free core layers 14 and/or 18 assist in preventing show-through of the black core paper used to form the core 16. The assembly of resin impregnated sheets is pressed under heat and pressured using conventional curing cycles to consolidate the sheets and cure the resin, thereby forming the laminate.

As noted above, both the core layers and the decor layer are impregnated with thermosetting resin to which has been added an ionic salt in an amount of no more than 7% by weight based on the resin solids. In general, lithium chloride is a preferred ionic salt as it gives better results than other salts because it gives the maximum number of ions on a per weight basis. However, a wide variety of ionic salts will work well, including sodium formate, sodium acetate, sodium chloride, magnesium chloride and calcium chloride, among others. Fluorides and bromides are less desirable because these are toxic and some present color problems. Sulphates are less desirable because they are undesirably heavy.

For purposes of the present invention, with the exception pointed out below, it is preferred to use lithium chloride as the ionic salt, the preferred quantity being in the range of 1%–3% based on the weight of the resin solids. At 2% lithium chloride concentration based on the resin solids, this converts to an amount of 0.17% based on the total weight of the decor sheet, a lesser quantity than has been suggested according to the prior art.

While lithium chloride is certainly the preferred ionic salt to be added to the phenolic resin for use in conjunction with the laminate core, halide salts including lithium chloride do have one disadvantage when used in the decor layer. Thus, halide salts tend to be corrosive and can cause damage to the pressing plate dies during manufacture of the laminate, and also have some potential, depending on the precise environment of use of the final product, to cause some problems in the environment of use of the product. To obviate this problem, another ionic salt such as sodium acetate or sodium formate can be used.

As noted above, use of a tertiary amine, glycerin or equivalent, believed to act as an humectant, is essential to the present invention. The tertiary amine or glycerin may be present in amounts up to about 8% by weight based on the resin solids, preferably 1-5% by weight, and need be added only to the resin used to impregnate the decor sheet, i.e. the top sheet of the laminate.

Preferred tertiary amines are ethoxylated aliphatic amines sold under the trademark ETHOMEEN by Akzo Chemie America, and disclosed in the manufacturer's Product Data Bulletin 80-8 (copyright 1980). These ethoxylated tertiary amines have one fatty alkyl group and two hydroxy ethyl or polyoxylene groups attached to the nitrogen atom, the alkyl group preferably containing 12-18 carbons and each molecule containing 2-50 oxyethylene groups. These compounds have the following formula:

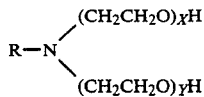

where R is $C_{12}$ to $C_{18}$ and X plus Y equals 2-50.

A number of the ETHOMEEN products were evaluated including ETHOMEEN C/25, ETHOMEEN S/12, ETHOMEEN T/12 and ETHOMEEN T/25. ETHOMEEN C/25 is polyoxyethylene (15 cocoamine (CTFA adopted name: PEG-15 cocoamine), ETHOMEEN S/12 is bis(2-hydroxyethyl)soyaamine (CTFA adopted name: PEG-2 soyaamine), ETHOMEEN T/12 is bis(2-hydroxyethyl)tallowamine (CTFA adopted name: PEG-2 tallow amine), and ETHOMEEN T/25 is polyoxyethylene (15) tallowamine (CTFA adopted name: PEG-25 tallow amine). Of the compounds evaluated, ETHOMEEN T/25 was chosen because of its good solubility in melamine resin. ETHOMEEN T/25 has a Gardner color maximum of 8, a combining weight of 890-950, a maximum moisture content of 1%, is a clear liquid to paste at 2° C., has a specific gravity at 25° C. of 1.028, a typical molecular weight of 922, a flash point of greater than 500° F. (Cleveland Open Cup method), contains 15 moles of ethylene oxide and has an HLB value (cationic) of 19.3.

The present invention provides a number of advantages, many of which are pointed out above. Very importantly, the present static dissipative laminate maintains a surface resistance value within the static dissipative range, i.e. no greater than about $10^9$ ohms, even at very low relative humidities, e.g. as low as 17% relative humidity.

The present laminate, e.g. incorporating about 1-4% of an ionic salt and about 1-5% of a tertiary amine or glycerin, based on the melamine solids in the decor layer, provides an order of magnitude improvement in resistivity compared with otherwise equivalent laminate made with either component alone. As the mixture of ionic salt and tertiary amine or glycerin is equivalent to parallel circuits, the improvement in resistivity should be about double when using both together, rather than being increased by 1,000% as actually occurs. Accordingly, the two components appear to behave synergistically.

Another advantage of the invention is that by controlling the conductivity of the core within the range of $5 \times 10^4$ ohms to $5 \times 10^6$ ohms, the problem which occurred in the prior art of field suppression can be avoided. This occurs because of a reduction in the disparity between the surface resistivity and lower layer, i.e. core, resistivity.

The presence of the ultra-thin abrasion resistance upper surface according to Scher et al U.S. Pat. No. 4,255,480 or O'Dell et al 4,567,087 ensures not only that the surface of the present static dissipative laminate has good wear resistance, but it also reduces adverse effects of the laminate on the electronic components by reducing dusting of the laminate surface due to wear. This is demonstrated by using the sand paper test on the present static dissipative laminate which shows that its surface is highly resistant to dusting. In spite of the presence of solid lubricant, e.g. wax, in the upper surface of the laminate (consistent with O'Dell et al U.S. Pat. No. 4,567,087), the static dissipative properties of the laminate are excellent as pointed out above.

Lastly, the present static dissipative laminate looks like normal decorative high pressure laminate. It has good heat resistance, water resistance and stain resistance. It will post form if cured in a post-forming cycle in addition to having the desired electrical properties as pointed out above.

The following examples will illustrates the manner in which the invention can be practiced. It is to be understood that these examples are not to be considered limiting of the invention, but are offered illustratively.

EXAMPLE 1 (COMPARATIVE)

Control laminates were made and tested for electrical properties. Each laminate was made with an abrasion resistant ultra-thin upper layer in accordance with O'Dell et al U.S. Pat. No. 4,567,087 using solid color decor paper saturated with melamine to 50-54% resin content and 5-7% volatile content.

Sample 1 had normal 156 pound basis weight kraft core paper saturated with phenolic resin at 28-32% resin content, 6-8% volatile content and 1-5% flow, consistent with the manufacture of conventional laminate.

Sample 2 had a core manufactured with 100 pound black carbon paper saturated with unmodified phenolic resin at 30-34% resin content, 4-6% volatile content and 1-3% flow.

Sample 3 was the same as sample 2 except that the 100 pound black carbon paper was saturated with phenolic modified by the addition of 4% lithium chloride on the basis of phenolic solids.

All three samples were pressed at 290°-300° F. and 1,000-1,200 psi in a general purpose cycle. The three laminates were tested for their electrical properties at 50% relative humidity, and the results are given in Table 1 below:

TABLE 1

| | Measured at 50% R. H. | | |
| --- | --- | --- | --- |
| Sample | Surface Resistance Ohms | Volume Resistance Ohms | Surface Resistivity Ohms/square |
| 1 | $4 \times 10^{10}$ | $3 \times 10^9$ | $3 \times 10^{11}$ |
| 2 | $1.3 \times 10^{10}$ | $4 \times 10^9$ | $4 \times 10^{10}$ |

TABLE 1-continued

| | Measured at 50% R. H. | | |
|---|---|---|---|
| Sample | Surface Resistance Ohms | Volume Resistance Ohms | Surface Resistivity Ohms/square |
| 3 | $2.5 \times 10^{10}$ | $2 \times 10^9$ | $1.2 \times 10^{11}$ |

None of these laminates was suitable for static dissipative worktops. It is therefore seen that the addition of modified phenolic and black carbon filled paper did not substantially improve the desired electrical properties.

EXAMPLE 2 (COMPARATIVE)

Other samples were made similar to sample 3 of Example 1, except that the malamine resin used to impregnate the decor sheet was modified with 3% of one of sodium chloride, magnesium chloride, calcium chloride and sodium acetate. These samples were therefore somewhat comparable to the laminates disclosed in Cannady et al U.S. Pat. No. 4,480,001. The four samples were tested for electrical properties in comparison with a control. The results of the test at 50% relative humidity are shown in Table 2 below:

TABLE 2

| | Measured at 50% R. H. | | |
|---|---|---|---|
| Melamine Modification | Surface Resistance Ohms | Volume Resistance Ohms | Surface Resistivity Ohms/square |
| Sodium Chloride | $2 \times 10^7$ | $1.5 \times 10^7$ | $1.8 \times 10^8$ |
| Magnesium Chloride | $5 \times 10^9$ | $1 \times 10^9$ | $4 \times 10^{10}$ |
| Calcium Chloride | $1.5 \times 10^9$ | $3 \times 10^8$ | $6.3 \times 10^9$ |
| Sodium Acetate | $2 \times 10^8$ | $1.1 \times 10^8$ | $1.5 \times 10^8$ |
| None (Control) | $2.5 \times 10^{10}$ | $2 \times 10^9$ | $\frac{1}{2} \times 10^{11}$ |

These tests show that the addition of salt to the decor layer improved the electrical properties considerably as compared with sample 3 of Example 1. The surface resistance of the samples was satisfactory at 50% relative humidity, except possibly the magnesium chloride containing sample which was borderline. However, at lower relative humidities the samples were not satisfactory as is apparent from results given below.

EXAMPLE 3

Four samples were prepared similar to sample 3 of Example 1, except that the melamine resin used to impregnate the decor sheet was modified as shown in Table 3 below. In one sample the melamine resin was modified by the addition of only 5% ETHOMEEN T/25, and in three other samples by the addition of 5% ETHOMEEN T/25 plus an ionic salt. After manufacture of the laminates, the samples were tested for their electrical properties at 50% relative humidity. The results are shown in Table 3 below:

TABLE 3

| | Measured at 50% R. H. | |
|---|---|---|
| Melamine Modifier | Surface Resistance Ohms | Volume Resistance Ohms |
| None (Control) | $2.5 \times 10^{10}$ | $2 \times 10^9$ |
| 5% T/25 | $8 \times 10^9$ | $4 \times 10^8$ |
| 5% T/25 + 1% Lithium Chloride | $9 \times 10^8$ | $1.4 \times 10^8$ |
| 5% T/25 + 2% Lithium Chloride | $5.1 \times 10^7$ | $7.1 \times 10^7$ |
| 5% T/25 + 4% Sodium Acetate | $8.9 \times 10^7$ | $6.0 \times 10^7$ |

From these runs, it can be seen that the addition of the tertiary amine to the melamine resin used to impregnate the decor sheet improved conductivity relative to the control. Addition of ionic salt to the amine modified melamine resin improved it further. More sodium acetate was required than lithium chloride because more ions per pound of lithium chloride are obtained than of sodium acetate.

EXAMPLE 4

A series of four static dissipative laminates according to the present invention were made using carbon paper core sheets impregnated with phenolic resin containing 3% lithium chloride and four solid colored decor sheets having ultra-thin abrasion resistant surfaces and impregnated with melamine resin containing 5% ETHOMEEN T/25 and 4% sodium acetate. The resultant laminates were compared at various relative humidities with products currently available on the market manufactured by three different manufacturers. The results are shown in Table 4 below, the item marked "invention" corresponding to an average of the four samples produced according to the present invention:

TABLE 4

| Electrical Properties at Varied Relative Humidities | | | |
|---|---|---|---|
| Relative Humidity 50% Sample | Surface Resistance Ohms | Volume Resistance Ohms | Surface Resistivity Ohms/square |
| Relative Humidity 50% | | | |
| Invention | $3.8 \times 10^7$ | $2 \times 10^7$ | $1.4 \times 10^8$ |
| Competitive 1 | $5 \times 10^6$ | $3 \times 10^8$ | $6 \times 10^7$ |
| Competitive 2 | $8 \times 10^6$ | $2 \times 10^8$ | $7 \times 10^7$ |
| Competitive 3 | $2 \times 10^7$ | $1 \times 10^8$ | $2 \times 10^8$ |
| Relative humidity 25% - Samples equilibrated for 72 hours | | | |
| Invention | $1.6 \times 10^9$ | $8.3 \times 10^9$ | $2.4 \times 10^{10}$ |
| Competitive 1 | $3 \times 10^{10}$ | $6 \times 10^{10}$ | $2.8 \times 10^{10}$ |
| Competitive 2 | $2 \times 10^9$ | $1.4 \times 10^{10}$ | $4.5 \times 10^{10}$ |
| Competitive 3 | $1.6 \times 10^{10}$ | $3 \times 10^{10}$ | $8 \times 10^{10}$ |
| Relative humidity 17% - Samples equilibrated for 72 hours | | | |
| Invention | $1.3 \times 10^9$ | $4.3 \times 10^{10}$ | $1 \times 10^{10}$ |
| Competitive 1 | $2 \times 10^{10}$ | $3 \times 10^{11}$ | $1 \times 10^{11}$ |
| Competitive 2 | $2 \times 10^{10}$ | $4 \times 10^{10}$ | $1 \times 10^{11}$ |
| Competitive 3 | $1.3 \times 10^{11}$ | $4 \times 10^{11}$ | $1 \times 10^{11}$ |

From the comparative tests shown above, it is evident that while all these samples are roughly comparable at 50% relative humidity, only the static dissipative laminates according to the present invention remained in the dissipative range for surface resistance at 17% relative humidity.

EXAMPLE 5

Additional laminate was made according to the present invention similar to that of Example 4, except that the melamine resin used to impregnate the decor sheet was modified by the addition of 2% by weight based on the resin solids of lithium chloride and 2% ETHOMEEN T/25. This product, marked Nevamar-SDL in Table 5 below, was compared with four commercial static dissipative laminates made by four different manufacturers, a standard laminate of the present assignee and a sample similar to the "Nevamar-SDL" sample except without the tertiary aliphatic amine. The seven samples were comparatively tested for surface resistivity and voltage decay at various relative humidities. The results are shown in Table 5 below.

TABLE 5

| Product | Relative Humidity | | | | |
|---|---|---|---|---|---|
| | 10% | 15% | 25% | 30% | 50% |
| SURFACE RESISTIVITY - OHMS/SQUARE | | | | | |
| Commercial I | $5 \times 10^{10}$ | $1.5 \times 10^{11}$ | $5.0 \times 10^9$ | $7 \times 10^9$ | $6 \times 10^9$ |
| Commercial II | $3 \times 10^{10}$ | $1.2 \times 10^{11}$ | $7.0 \times 10^{10}$ | $9 \times 10^{10}$ | $2.5 \times 10^8$ |
| Commercial III | $4 \times 10^{12}$ | $4 \times 10^{12}$ | $6 \times 10^{11}$ | $6 \times 10^{10}$ | $4.6 \times 10^9$ |
| Commercial IV | $1 \times 10^{12}$ | $1 \times 10^{12}$ | $10 \times 10^{11}$ | $3.3 \times 10^{10}$ | $3 \times 10^{10}$ |
| NEVAMAR STANDARD | $3 \times 10^{11}$ | $6 \times 10^{11}$ | $3.6 \times 10^{10}$ | $6 \times 10^{10}$ | $1.6 \times 10^9$ |
| NEVAMAR 2% LiCl | $3 \times 10^{10}$ | $1.6 \times 10^{10}$ | $9.0 \times 10^9$ | $3.3 \times 10^{10}$ | $1.0 \times 10^8$ |
| NEVAMAR - SDL* | $4 \times 10^9$ | $6.5 \times 10^9$ | — | $5.0 \times 10^9$ | $1.6 \times 10^8$ |
| VOLTAGE DECAY REAL VOLTAGE AS MEASURED IN THE "SUPPRESSION TEST" AT 2 SECONDS AFTER REMOVAL OF CHARGE - VOLTS | | | | | |
| Commercial I | 750 | 500 | 250 | 0 | 0 |
| Commercial II | 1000 | 750 | 0 | 0 | 0 |
| Commercial III | 1500 | 1000 | 750 | 500 | 250 |
| Commercial IV | 1750 | 1500 | 1250 | 1500 | 250 |
| NEVAMAR STANDARD | 1500 | 1250 | 750 | 750 | 250 |
| NEVAMAR 2% LiCl | 750 | 1000 | — | 750 | — |
| NEVAMAR-SDL* | 0 | 0 | — | 0 | — |

*SDL = Static dissipative laminate - 2% LiCl + 2% Tertiary Aliphatic Amine

The consistently low surface resistivity of the present static dissipative laminate, even at very low relative humidity, is evident. The voltage decay test shows that the present static dissipative laminate does not suffer from the problem of field suppression.

EXAMPLE 6

Two static dissipative laminates according to the present invention are made according to Example 4 except that in the first the decor sheet contains 1.5% sodium formate and 4.8% glycerin, based on resin solids; and in the second sheet the glycerin content is again 4.8% and the sodium formate content is 2.7%. Glycerin takes the place of the aliphatic tertiary amine used in the proceeding Examples. In both cases the product is found to have the desired electrical properties.

The foregoing description of the specific embodiments will so fully reveal the general nature of the invention that others can, by applying current knowledge, readily modify and/or adapt such specific embodiments without departing from the generic concept, and therefore such adaptations and modifications should and are intended to be comprehended within the meaning and range of equivalents of the disclosed embodiments. It is to be understood that the phraseology or terminology employed herein is for purposes of description and not of limitation.

What is claimed is:

1. A decorative, static dissipative, high pressure laminate comprising a plurality of consolidated layers including a plurality of carbon containing core layers impregnated with thermoset core resin containing up to 6% by weight based on the weight of the resin solids of an ionic salt; and
   a decor layer above said core layers, said decor layer having an abrasion resistant covering thereon and impregnated with thermoset resin containing 1-7% by weight of an ionic salt and an humectant in an amount sufficient to provide a surface resistance no greater than about $2 \times 10^9$ at a relative humidity of 17%.

2. A laminate according to claim 1 further comprising a core layer formed of kraft paper without carbon and impregnated with said thermoset core resin, located between said carbon containing core layers and said decor layer.

3. A laminate according to claim 2 further containing a bottom core layer lying beneath said carbon containing core layers, said bottom core layer being formed of kraft paper without carbon and impregnated with said thermoset core resin.

4. A laminate according to claim 1 further comprising a bottom core layer formed of kraft paper without carbon, and impregnated with said ionic salt containing core resin.

5. A laminate according to claim 1 further comprising an ultra-thin abrasion resistant layer containing solid lubricant forming the upper surface of said laminate.

6. A laminate according to claim 1 wherein said ionic salt is lithium chloride.

7. A laminate according to claim 1 wherein said ionic salt in said decor layer is sodium acetate or sodium formate and said ionic salt in said core layers is lithium chloride.

8. A laminate according to claim 1 wherein the resistance of the core is about $10^6$–$10^9$ ohms.

9. A laminate according to claim 1 having a zero volt charge after two seconds at 17% or lower relative humidity.

10. A laminate according to claim 1 wherein said abrasion resistant covering on said decor layer is an ultra-thin abrasion resistant coating thereon.

11. A laminate according to claim 10 wherein said ultra-thin abrasion resistant coating contains solid lubricant so that said laminate is scuff resistant.

12. A laminate according to claim 1 wherein the quantity of ionic salt, based on the weight of resin solids, is 1-4%.

13. A laminate according to claim 1 wherein said ionic salt in said core resin comprises lithium chloride present in an amount of 1-3% by weight, based on the weight of the core resin solids.

14. A laminate according to claim 1 wherein said aliphatic tertiary amine is present in an amount of 1-4% by weight, based on the weight of resin solids.

15. A decorative, static dissipative, high pressure laminate comprising a plurality of consolidated layers having a zero volt charge after two second at 17% or lower relative humidity, said consolidated layers including
   a plurality of core layers having a conductivity of $5 \times 10^4$ to $5 \times 10^6$ ohms; and a decor layer above said core layers, said decor layer being impregnated with a thermoset resin containing an amount sufficient of an ionic salt humectant and to provide a surface resistance no greater than about $2\times10^9$ at a relative humidity of 17%.

16. A decorative, static dissipative, high pressure laminate according to claim 1, wherein said humectant is an aliphatic tertiary amine present in an amount of 1–6% by weight based on the weight of resin solids.

17. A decorative, static dissipative, high pressure laminate according to claim 1, wherein said humectant is glycerin present in an amount of about 1–8% by weight based on the weight of resin solids.

18. A static dissipative, high pressure laminate comprising a plurality of consolidated layers having a zero volt charge after two seconds at 17% or lower relative humidity, said consolidated layers including a plurality of core layers having a conductivity of $5\times10^4$ to $5\times10^6$ ohms; and
a decor layer above said core layers, said decor layer being impregnated with a thermoset resin and an amount sufficient of an ionic salt, glycerin or an aliphatic tertiary amine to provide a surface resistance no greater than about $2\times10^9$ at a relative humidity of 17%.

19. A laminate according to claim 18 wherein said decor layer is covered with an ultra-thin abrasion resistant coating containing solid lubricant.

20. A laminate according to claim 18 wherein said plurality of core layers includes at least one carbon containing core layer, a core layer formed of kraft paper without carbon located between said at least one carbon containing core layer and said decor layer, and a bottom core layer formed of kraft paper without carbon.

* * * * *